G. SHAVER.
CULTIVATOR.
No. 246,224. Patented Aug. 23, 1881.
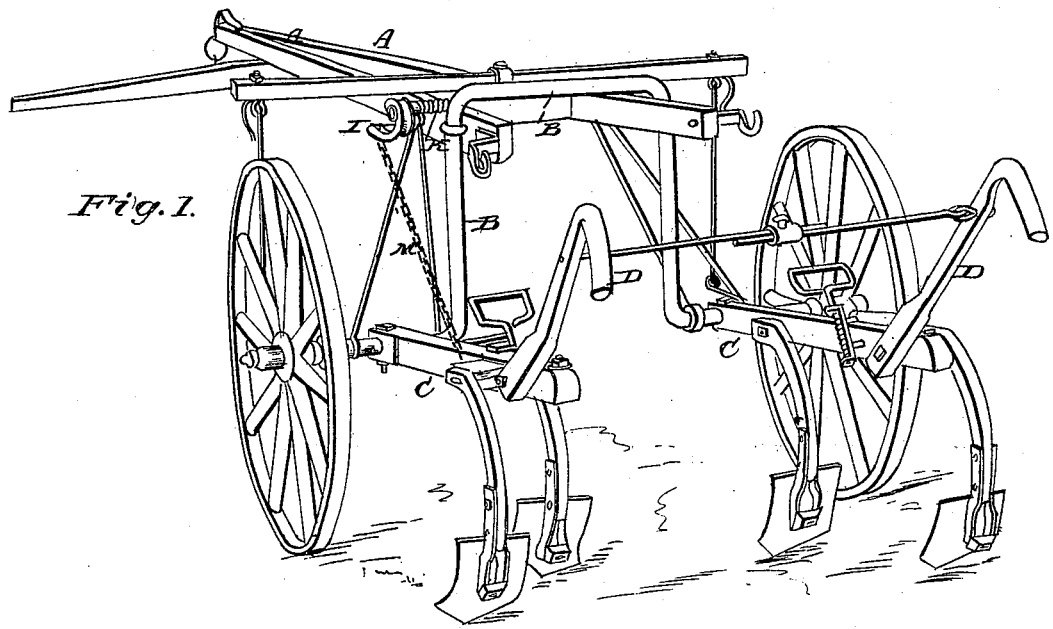
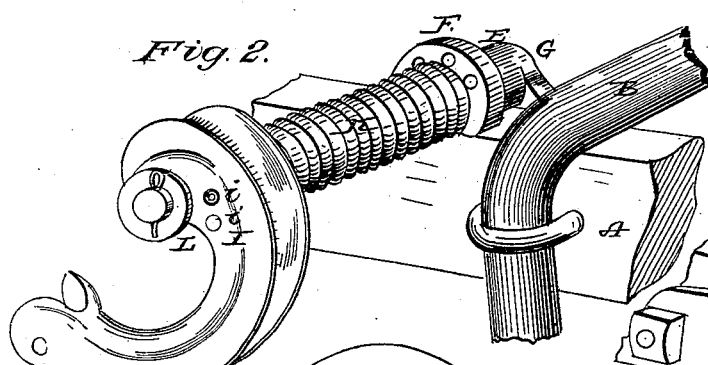
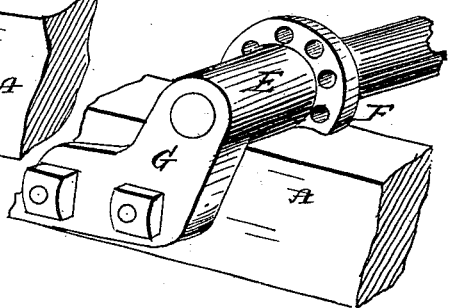
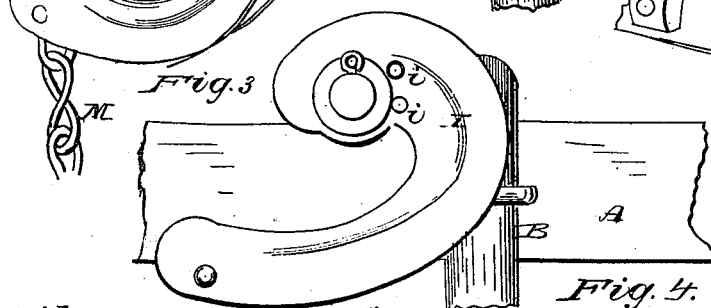
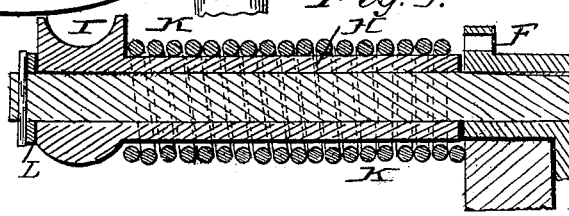
Witnesses
Fred G. Dieterich
B. L. Dieterich
Inventor
George Shaver
by
G. Louis Bagger
Attorneys

UNITED STATES PATENT OFFICE.

GEORGE SHAVER, OF FLORENCE TOWNSHIP, STEPHENSON COUNTY, ILL.

CULTIVATOR.

SPECIFICATION forming part of Letters Patent No. 246,224, dated August 23, 1881.

Application filed February 13, 1880.

*To all whom it may concern:*

Be it known that I, GEORGE SHAVER, of Florence township, in the county of Stephenson and State of Illinois, have invented certain new and useful Improvements in Cultivators; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of a walking-cultivator provided with my improvement. Fig. 2 is a perspective detail view of the attachment which constitutes my improvement detached. Fig. 3 is a side elevation of the same. Fig. 4 is a longitudinal (axial) section; and Fig. 5 is a perspective view of the rear part of the stationary hub.

Similar letters of reference indicate corresponding parts in all the figures.

My invention has relation to that class of devices or attachments which are adapted to exercise a gradually-increasing pull upon a chain secured at one end thereof, and is therefore particularly adapted as an attachment to walking and riding cultivators, sulky-rakes, and similar agricultural implements which are provided with shovel or teeth carrying beams hinged upon a frame and adapted to be raised or lowered to bring the shovels or teeth, as the case may be, out of or into operation or contact with the soil. To raise the hinged beams of implements of this nature up from the ground requires the exertion of considerable power, the force or power required for this purpose increasing in the same ratio as the distance from the ground. Hence the object of my invention is to construct a simple and efficient device or attachment consisting, essentially, of a cam-sheave which is turned by the force of a spring and connected to one end of the chain, which, on being wound up by the sheave, raises the beams, so that very little power is required for this operation of raising the beam or beams, as the force of the spring is increased in exactly the same ratio as that of the resistance to be overcome, as will more fully appear by reference to the following description of my improvement as applied to and forming a part of a cultivator.

In the present illustration of my invention A A is the tongue, to the rear end of which is bolted the bent or arched axle B.

C C are the beams, which are hinged at their forward ends upon the lower part of the axle, and have handles D D, by means of which they may be raised or lowered vertically. Upon the tongue A A is bolted, on each side, a hub, E, which is cast with a perforated flange or shoulder, F, and an arm, G, by which it is bolted upon the tongue. Inserted upon this laterally-projecting hub E is a box or sleeve, H, the outer end of which is provided with a grooved cam, I, having one or more perforations, *i i*, near its center.

K is a spiral spring, which is coiled around the box or sleeve H, one of its ends being bent at right angles to form a stud, which is inserted into one of the perforations, *f*, of the shoulder F of the stationary hub E, while its other (outer) end is similarly bent and inserted into one of the perforations, *i*, of the cam-sheave.

L is a washer, which is inserted upon the outer end of the hub or spindle E, and held in place by a pin, nut, or in any other suitable manner.

In the outer end of cam I is affixed a chain, M, the lower end of which is secured in its corresponding beam C. The spring K is secured upon its sleeve H, (in relation to the cam-sheave and hub-flange F,) so that when the beam is down with the shovels in the ground, as represented in Fig. 1 of the drawings, the connecting-chain M will draw from the outer long end of cam I, the leverage of the cam overcoming or balancing the tension of the spring; but when the beam is raised, the chain being thus relieved from strain, the spring will turn its cam forward and upward, as indicated by the arrow, thus winding the chain up with gradually-increasing power as the chain draws nearer from the center of the cam-sheave, and thereby greatly facilitating the operation of elevating the shovel-beams and shovels.

It is obvious that this improvement may be applied in like manner to a riding-cultivator or sulky-rake, or for many other purposes—as, for example, the vane and fans of a windmill, farm - gates, &c.—where it is desired at one point to have the resistance of the operating-spring at zero, but as soon as this point has been overcome to have it gradually increase its power through the medium of the eccentric cam-sheave. Other springs than a spiral spring may be used for operating the said cam and cam-sheave in the manner described; and the hub E may be modified in its construction, according to the purposes for which the device is to be used.

Having thus described my invention, I claim and desire to secure by Letters Patent of the United States—

1. The combination of the stationary hub or spindle E, sleeve H, provided with the grooved or channeled eccentric cam-sheave I, chain M, and spring K, substantially as set forth.

2. In combination, the stationary hub or spindle E, having perforated shoulder F, and arm G, sleeve H, provided with the eccentric grooved and perforated cam-sheave I, spring K, and chain M, substantially as and for the purpose herein shown and described.

In testimony that I claim the foregoing as my own I have hereto affixed my signature in presence of two witnesses.

GEORGE SHAVER.

Witnesses:
J. BROWN TAYLOR,
RICHD. BICKENBACH.